United States Patent

Sens et al.

[11] Patent Number: 6,123,740
[45] Date of Patent: Sep. 26, 2000

[54] DYE PREPARATIONS CONTAINING METHINE DYES

[75] Inventors: Rüdiger Sens, Mannheim; Bernd Siegel, Otterstadt; Manfred Herrmann, Ludwigshafen, all of Germany

[73] Assignee: BASF Aktiengesellschaft, Ludwigshafen, Germany

[21] Appl. No.: 09/308,660

[22] PCT Filed: Nov. 18, 1997

[86] PCT No.: PCT/EP97/06420

§ 371 Date: Jun. 2, 1999

§ 102(e) Date: Jun. 2, 1999

[87] PCT Pub. No.: WO98/24850

PCT Pub. Date: Jun. 11, 1998

[30] Foreign Application Priority Data

Dec. 2, 1996 [DE] Germany ............ 196 49 802

[51] Int. Cl.⁷ .................. D06P 5/30; D06P 1/52
[52] U.S. Cl. ............... 8/445; 8/499; 8/552; 8/557; 8/560; 8/576
[58] Field of Search ............... 8/552, 557, 576, 8/587, 589, 594, 692, 471, 445, 466

[56] References Cited

U.S. PATENT DOCUMENTS

| | | |
|---|---|---|
| 2,979,528 | 4/1961 | Lundsted . |
| 4,218,218 | 8/1980 | Daubach et al. . |
| 5,079,365 | 1/1992 | Sens et al. . |
| 5,186,846 | 2/1993 | Brueckmann et al. . |
| 5,376,150 | 12/1994 | Lange et al. . |
| 5,616,710 | 4/1997 | Sens et al. . |
| 5,700,757 | 12/1997 | Sens et al. . |

FOREIGN PATENT DOCUMENTS

| | | |
|---|---|---|
| 0 655 527 | 5/1995 | European Pat. Off. . |
| 0 727 463 | 8/1996 | European Pat. Off. . |
| 29 47 005 | 6/1981 | Germany . |
| 43 44 116 | 6/1995 | Germany . |
| WO 95/17470 | 6/1995 | WIPO . |
| WO 95/22581 | 8/1995 | WIPO . |

OTHER PUBLICATIONS

B. Smith, et al., Text. Chem. Color, vol. 19, No. 8, pp. 23–29, "Ink Jet Printing for Textiles", Aug., 1987.

L.A. Graham, Text. Chem. Color, vol. 21, No. 6, pp. 27–32, "Ink Jet Systems for Dyeing and Printing of Textiles", Jun., 1989.

*Primary Examiner*—Margaret Einsmann
*Attorney, Agent, or Firm*—Oblon, Spivak, McClelland, Maier & Neustadt, P.C.

[57] ABSTRACT

Dye preparations useful as inks in the inkjet process and for sublimation transfer printing comprise, based on the weight of each preparation, from 0.1 to 30% by weight of one or more methine dyes, from 0.1 to 20% by weight of a dispersant based on an arylsulfonic acid-formaldehyde condensation product or from 0.1 to 20% by weight of a water-soluble dispersant based on alkoxylated phenols and optionally water.

6 Claims, No Drawings

DYE PREPARATIONS CONTAINING METHINE DYES

The present invention relates to novel dye preparations comprising, based on the weight of the preparation, from 0.1 to 30% by weight of one or more methine dyes, from 0.1 to 20% by weight of a dispersant based on an arylsulfonic acid-formaldehyde condensation product or from 0.1 to 20% by weight of a water-soluble dispersant based on alkoxylated phenols and optionally water, and to their use as inks in the inkjet process and for textile sublimation transfer printing.

EP-A-655 527 discloses dye preparations comprising disperse dyes and specific dispersants.

It is an object of the present invention to provide novel dye preparations comprising methine dyes, especially pyridine-based methine dyes. The novel dye preparations shall be advantageously useful for application in the inkjet process and also in textile sublimation transfer printing.

We have found that this object is achieved by the dye preparations defined at the beginning.

Suitable methine dyes are pyridine dyes in particular. These conform for example to the formula Ia, Ib or Ic

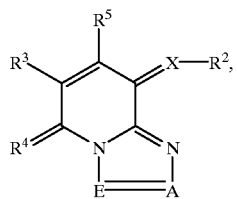
(Ia)

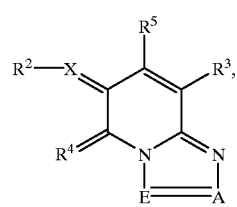
(Ib)

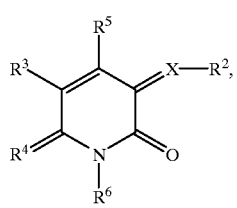
(Ic)

where
X is nitrogen or CH, one of the two radicals A and E is nitrogen and the other is a radical of the formula C—$R^1$, where $R^1$ is $C_1$–$C_{20}$-alkyl with or without substitution and with or without interruption by from one to four oxygen atoms in ether function, substituted or unsubstituted phenyl or hydroxyl, $R^2$ is a radical of the benzene, indole, quinoline, aminonaphthalene, pyrrole, benzimidazole, benzthiazole, aminothiophene or diaminopyridine series, $R^3$ is cyano, carbamoyl, carboxyl or $C_1$–$C_4$-alkoxycarbonyl, $R^4$ is oxygen or a radical of the formula $C(CN)_2$, $C(CN)COOL^1$ or $C(COOL^1)_2$, where $L^1$ is in each case $C_1$–$C_8$-alkyl, with or without interruption by one or two oxygen atoms in ether function, or phenyl, $R^5$ is hydrogen, $C_1$–$C_8$-alkyl with or without substitution and with or without interruption by one or two oxygen atoms in ether function or substituted or unsubstituted phenyl, and $R^6$ is $C_1$–$C_{20}$-alkyl with or without substitution and with or without interruption by one to four oxygen atoms in ether function, substituted or unsubstituted phenyl, hydroxyl or a radical of the formula $NL^2L^3$, where $L^2$ and $L^3$ are independently of each other hydrogen, substituted or unsubstituted $C_1$–$C_{12}$-alkyl, $C_5$–$C_7$-cycloalkyl, substituted or unsubstituted phenyl, substituted or unsubstituted pyridyl, substituted or unsubstituted $C_1$–$C_{12}$-alkanoyl, $C_1$–$C_{12}$-alkoxy-carbonyl, substituted or unsubstituted $C_1$–$C_{12}$-alkylsulfonyl, $C_5$–$C_7$-cycloalkylsulfonyl, substituted or unsubstituted phenylsulfonyl, substituted or unsubstituted pyridylsulfonyl, substituted or unsubstituted benzoyl, pyridylcarbonyl or thienylcarbonyl or $L^2$ and $L^3$ are together with the linking nitrogen atom unsubstituted or $C_1$–$C_4$-alkyl substituted succinimido, unsubstituted or $C_1$–$C_4$-alkyl-substituted phthalimido or a five or six-membered saturated heterocyclic radical which optionally contains further hetero atoms.

Important radicals $R^2$ are for example those of the formulae II to IIj

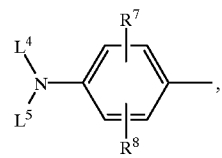
(IIa)

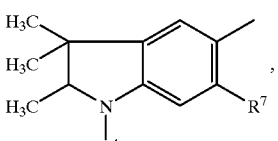
(IIb)

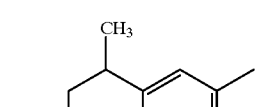
(IIc)

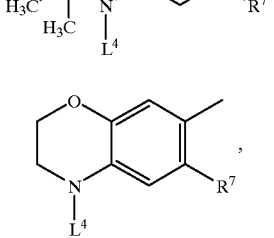
(IId)

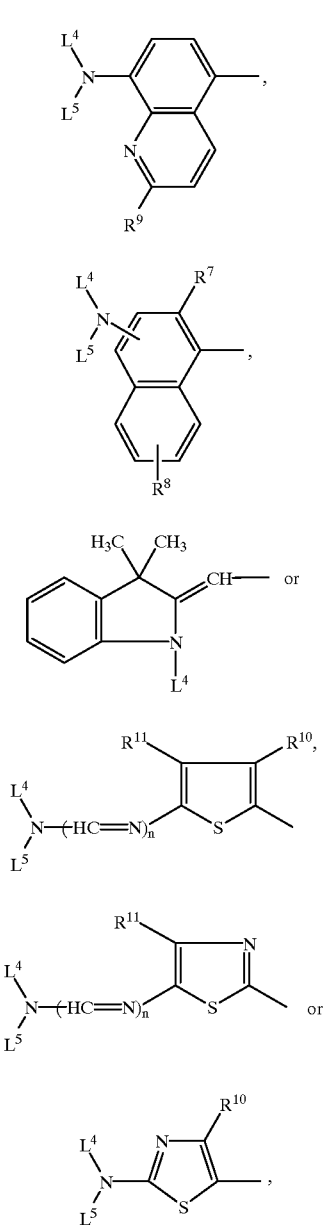

where
n is 0 or 1,
R⁷ is hydrogen, $C_1$–$C_8$-alkyl with or without interruption by one or two oxygen atoms in ether function, hydroxyl, $C_1$–$C_4$-alkoxy with or without hydroxyl substitution, especially methoxy or ethoxy, formylamino, $C_1$–$C_4$-alkylsulfonylamino, mono- or di-$C_1$–$C_4$-alkylaminosulfonylamino or the radical —NHCONHQ, —NHCOQ or —NHCO₂Q, where Q is phenyl, benzyl, $C_1$–$C_4$-alkylphenyl or $C_1$–$C_8$-alkyl with or without interruption by one or two oxygen atoms in ether function, R⁸ is hydrogen, $C_1$–$C_4$-alkyl, especially methyl, or $C_1$–$C_4$-alkoxy, especially methoxy or ethoxy, L⁴ and L⁵ are independently of each other hydrogen, $C_1$–$C_8$-alkyl with or without substitution and with or without interruption by one or two oxygen atoms in ether function, $C_3$–$C_4$-alkenyl, $C_5$–$C_7$-cycloalkyl, substituted or unsubstituted phenyl, or are together with the linking nitrogen atom a five- or six-membered saturated heterocyclic radical which optionally contains further hetero atoms, R⁹ is hydrogen or $C_1$–$C_4$-alkyl, especially methyl, R¹⁰ is hydrogen, halogen, $C_1$–$C_8$-alkyl, substituted or unsubstituted phenyl, substituted or unsubstituted benzyl, cyclohexyl, thienyl, hydroxyl, $C_1$–$C_4$-alkoxy, $C_1$–$C_4$-alkylthio or $C_1$–$C_8$-monoalkylamino, and R¹¹ is cyano, carbamoyl, mono- or di-$C_1$–$C_8$-alkylcarbamoyl, $C_1$–$C_8$-alkoxycarbonyl or substituted or unsubstituted phenyl.

Any substituted alkyl appearing in the abovementioned formulae may have as substituents for example substituted or unsubstituted phenyl, $C_1$–$C_8$-alkanoyloxy, $C_1$–$C_8$-alkylaminocarbonyloxy, $C_1$–$C_{20}$-alkoxycarbonyl, $C_1$–$C_{20}$-alkoxycarbonyloxy, the alkyl chain of the last two radicals optionally being interrupted by from one to four oxygen atoms in ether function and/or phenyl- or phenoxy-substituted, halogen, hydroxyl or cyano. The number of substituents in substituted alkyl is generally from one to three, preferably one or two.

Any alkyl appearing in the abovementioned formulae with interruption by oxygen atoms in ether function are preferably interrupted by one or two oxygen atoms in ether function.

Any substituted phenyl or pyridyl appearing in the abovementioned formulae may have as substituents for example $C_1$–$C_8$-alkyl, $C_1$–$C_8$-alkoxy, $C_1$–$C_4$-alkanoyloxy, halogen, especially chlorine or bromine, or carboxyl. The number of substituents in substituted phenyl or pyridyl is generally from one to three.

Any alkyl appearing in the abovementioned formulae may be straight-chain or branched.

Examples of suitable $L^1, L^2, L^3, L^4, L^5, Q, R^1, R^5, R^6, R^7, R^8, R^9$ and $R^{10}$, are methyl, ethyl, propyl, isopropyl, butyl, isobutyl, sec-butyl or tert-butyl.

Further examples of $L^1, L^2, L^3, L^4, L^5, Q, R^1, R^5, R^6, R^7$ and $R^{10}$ are pentyl, isopentyl, neopentyl, tert-pentyl, hexyl, 2-methylpentyl, heptyl, 1-ethylpentyl, octyl, 2-ethylhexyl or isooctyl.

Further examples of $L^2, L^3, R^1$ and $R^6$ are nonyl, isononyl, decyl, isodecyl, undecyl or dodecyl.

Further examples of $R^1$ and $R^6$ are tridecyl, isotridecyl, tetradecyl, pentadecyl, hexadecyl, heptadecyl, octadecyl, nonadecyl or eicosyl. (The above designations isooctyl, isononyl, isodecyl and isotridecyl are trivial names derived from the alcohols obtained by the oxo process—cf. Ullmann's Encyclopedia of Industrial Chemistry, 5th Edition, Vol. A 1, pages 290 to 293, and also Vol. A 10, pages 284 and 285).

Further examples of $L^1, L^4, L^5, Q, R^1, R^5$ and $R^6$ are 2-methoxyethyl, 2-ethoxyethyl, 2-propoxyethyl, 2-isopropoxyethyl, 2-butoxyethyl, 2- or 3-methoxypropyl, 2- or 3-ethoxypropyl, 2- or 3-propoxypropyl, 2- or 3-butoxypropyl, 2- or 4-methoxybutyl, 2- or 4-ethoxybutyl, 2- or 4-propoxybutyl, 3,6-dioxaheptyl, 3,6-dioxaoctyl, 4,8-dioxanonyl, 3,7-dioxaoctyl, 3,7-dioxanonyl, 4,7-dioxaoctyl, 4,7-dioxanonyl, 2- or 4-butoxybutyl or 4,8-dioxadecyl.

Further examples of $R^1$ and $R^6$ are 3,6,9-trioxadecyl, 3,6,9-trioxaundecyl, 3,6,9-trioxadodecyl, 3,6,9,12-tetraoxatridecyl, 3,6,9,12-tetraoxatetradecyl, 11-oxahexadecyl, 13-butyl-11-oxaheptadecyl or 4,11-dioxapentadecyl.

Examples of $R^3, R^{11}, L^2$ and $L^3$ are methoxycarbonyl, ethoxycarbonyl, propoxycarbonyl, isopropoxycarbonyl, butoxycarbonyl, isobutoxycarbonyl or sec-butoxycarbonyl.

Further examples of $R^{11}$ are mono- or dimethylcarbamoyl, mono- or diethylcarbamoyl, mono- or dipropylcarbamoyl, mono- or diisopropylcarbamoyl, mono- or dibutylcarbamoyl or N-methyl-N-butylcarbamoyl.

Further examples of $R^7$, $R^8$ and $R^{10}$ are methoxy, ethoxy, propoxy, isopropoxy, butoxy, isobutoxy or sec-butoxy.

Further examples of $R^{10}$ are methylthio, ethylthio, propylthio, isopropylthio, butylthio, isobutylthio or sec-butylthio.

Further examples of $L^2$, $L^4$, $L^5$, $R^1$, $R^5$, $R^6$ and $R^{10}$ are phenyl, 2-, 3- or 4-methylphenyl, 2-, 3- or 4-ethylphenyl, 2-, 3- or 4-propylphenyl, 2-, 3- or 4-isopropylphenyl, 2-, 3- or 4-butylphenyl, 2,4-dimethylphenyl, 2-, 3- or 4-methoxyphenyl, 2-, 3- or 4-ethoxyphenyl, 2-, 3- or 4-isobutoxyphenyl, 2,4-dimethoxyphenyl, 2-, 3- or 4-formyloxyphenyl, 2-, 3- or 4-acetyloxyphenyl, 2-, 3- or 4-propionyloxyphenyl, 2-, 3- or 4-chlorophenyl or 2-, 3- or 4-carboxyphenyl.

Further examples of $L^2$, $L^4$, $L^5$, $R^1$, $R^5$ and $R^6$ are 2-chloroethyl, trifluoromethyl, 2- or 3-chloropropyl, benzyl, 1- or 2-phenylethyl, 3-benzyloxypropyl, phenoxymethyl, 6-phenoxy-4-oxahexyl, 8-phenoxy-4-oxahexyl, 2-hydroxyethyl, 2- or 3-hydroxypropyl, 2-cyanoethyl, 2- or 3-cyanopropyl, 2-acetyloxyethyl, 2- or 3-acetyloxypropyl, 2-isobutyryloxyethyl, 2- or 3-isobutyryloxypropyl, 2-methoxycarbonylethyl, 2- or 3-methoxycarbonylpropyl, 2-ethoxycarbonylethyl, 2- or 3-ethoxycarbonylpropyl, 2-methoxycarbonyloxyethyl, 2- or 3-methoxycarbonyloxypropyl, 2-ethoxycarbonyloxyethyl, 2- or 3-ethoxycarbonyloxypropyl, 2-butoxycarbonyloxyethyl, 2- or 3-butoxycarbonyloxypropyl, 2-(2-phenylethoxycarbonyloxy)ethyl, 2- or 3-(2-phenylethoxycarbonyloxy)propyl, 2-(2-ethoxyethoxycarbonyloxy)ethyl or 2- or 3-(2-ethoxyethoxycarbonyloxy)propyl.

Further examples of $L^2$ and $L^3$ are formyl, acetyl, propionyl, butyryl, isobutyryl, pentanoyl, hexanoyl, heptanoyl, octanoyl, 2-ethylhexanoyl, methylsulfonyl, ethylsulfonyl, propylsulfonyl, isopropylsulfonyl, butylsulfonyl, cyclopentylsulfonyl, cyclohexylsulfonyl, cycloheptylsulfonyl, phenylsulfonyl, tolylsulfonyl, pyridylsulfonyl, benzoyl, 2-, 3- or 4-methylbenzoyl, 2-, 3- or 4-methoxybenzoyl, thien-2-ylcarbonyl or thien-3-ylcarbonyl.

Further examples of $L^2$, $L^3$ and Y are pyridyl, 2-, 3- or 4-methylpyridyl or 2-, 3- or 4-methoxypyridyl.

Further examples of $L^2$, $L^3$, $L^4$ and $L^5$ are cyclopentyl cyclohexyl, cycloheptyl, methylcyclopentyl or methylcyclohexyl.

Examples of $R^7$ are methylsulfonylamino, ethylsulfonylamino, propylsulfonylamino, isopropylsulfonylamino, butylsulfonylamino, mono- or dimethylaminosulfonylamino, mono- or diethylaminosulfonylamino, mono- or dipropylaminosulfonylamino, mono- or diisopropylaminosulfonylamino, mono- or dibutylaminosulfonylamino, (N-methyl-N-ethylaminosulfonyl)amino, 2-hydroxyethoxy, 2- or 3-hydroxypropoxy or 2- or 4-hydroxybutoxy.

Further examples of $R^{10}$ are fluorine, chlorine, bromine, benzyl, 2-methylbenzyl, 2,4-dimethylbenzyl, 2-methoxybenzyl, 2,4-dimethoxybenzyl, methylamino, ethylamino, propylamino, isopropylamino, butylamino, pentylamino, hexylamino, heptylamino, octylamino or 2-ethylhexylamino.

$L^2$ and $L^3$ or $L^4$ and $L^5$ each combined with the linking nitrogen atom into a five- or six-membered saturated heterocyclic radical which optionally contains further hetero atoms can be for example pyrrolidinyl, piperidinyl, morpholinyl, piperazinyl or N-($C_1$–$C_4$-alkyl)piperazinyl.

Preference for use in the dye preparations of the invention is given to pyridine dyes of the formula Ia, Ib or Ic where $R^3$ is cyano.

Preference for use in the dye preparations of the invention is further given to pyridine dyes of the formula Ia, Ib or Ic where $R^4$ is oxygen.

Preference for use in the dye preparations of the invention is further given to pyridine dyes of the formula Ia, Ib or Ic where $R^5$ is methyl.

Preference for use in the dye preparations of the invention is further given to pyridine dyes of the formula Ic where $R^5$ is trifluoromethyl.

Preference for use in the dye preparations of the invention is further given to pyridine dyes of the formula Ia, Ib or Ic, where $R^1$ and $R^6$ are independently of each other $C_1$–$C_{12}$-alkyl with or without substitution by $C_1$–$C_6$-alkanoyloxy, by $C_1$–$C_8$-alkoxycarbonyl whose alkyl chain may in each case be interrupted by one or two oxygen atoms in ether function, by phenyl or by $C_1$–$C_4$-alkylphenyl and with or without interruption by one or two oxygen atoms in ether function.

Particular preference for use in the dye preparations of the invention is given to pyridine dyes of the formula Ia, Ib or Ic where $R^1$ and $R^6$ are independently of each other alkyl, alkoxyalkyl, alkanoyloxyalkyl or alkoxycarbonylalkyl, which radicals each have up to twelve carbon atoms, unsubstituted or methyl-substituted benzyl or unsubstituted or methyl-substituted phenyl.

Preference for use in the dye preparations of the invention is further given to pyridine dyes of the formula Ia, Ib or Ic where $R^2$ is a radical of the aniline or thiazole series, especially a radical of the formula IIa or IIj.

When the pyridine dye in the dye mixture is a triazolopyridine dye of the formula Ia or Ib, preference for use in the dye preparations of the invention is given in particular to those triazolopyridine dyes of the formula Ia where A is a radical of the formula C—$R^1$ and E is nitrogen.

Particular preference for use in the dye preparations according to the invention is further given to pyridine dyes of the formula Ia, Ib or Ic where $R^2$ is a radical of the formula IIj where $L^4$ and $L^5$ are independently $C_1$–$C_6$-alkyl and $R^{10}$ is $C_1$–$C_6$-alkyl or phenyl.

The pyridine dyes of the formula I are known per se and are described for example in U.S. Pat. No. 5,079,365, WO-A-95/17470, WO-A-95/22581 or in earlier patent application EP-A-727 463 or can be obtained by the methods mentioned therein.

Preference is given to dye preparations wherein 99% of the dye particles are smaller than 1 μm.

Preference is given to using a dispersant comprising an arylsulfonic acid-formaldehyde condensation product comprising from 3 to 50% by weight, based on the weight of the dispersant, of one or more aromatic or long-chain aliphatic carboxylic acids, their salts, their anhydrides or a mixture thereof.

The arylsulfonic acid-formaldehyde condensates used are in particular those having a maximum sulfonic acid group content of 40% by weight.

Suitable starting materials for the arylsulfonic acids include in particular a mixture of aromatic compounds obtainable by thermal cracking of a naphthenic residue oil and fractionation of the cracking products. Naphthenic residue oils are obtained for example in the cracking of light gasoline. In DE-A-2 947 005, for example, they are referred to as high boiling aromatic hydrocarbon oils. The naphthenic residue oil is preferably thermally cracked at from 1400 to 1700° C. The cracking products are then subjected to fractional distillation. The fraction passing over at atmospheric pressure (1013 mbar) at from 100 to 120° C. is collected and used as the aromatic compound for the sulfonation. Such a fraction is customarily obtained as a by-product in the known acetylene oil quench process (Ullmann's Encyclopedia of Industrial Chemistry, VCH Verlagsgesellschaft mbH, Weinheim, 1985, Volume A1, pages 107 to 112).

This aromatics fraction consists of a mixture of many aromatic substances whose structure and quantity can in practice not be determined in detail. The following aryl compounds are the chief representatives in this aromatics fraction:

|  | % by weight in aromatics fraction |
| --- | --- |
| Naphthalene | 30–55 |
| 2-Methylnaphthalene | 5–15 |
| 1-Methylnaphthalene | 4–10 |
| Indene | 3–10 |
| Biphenyl | 1–5 |
| Methylindene | 1–5 |
| Acenaphthene | 1–4 |

The aromatics fraction additionally includes in terms of identified constituents amounts from 0.1 to about 2% by weight of the following aryl compounds: fluorene, indane, methylstyrene, phenanthrene, methylindane, dimethylnaphthalene, ethylnaphthalene, xylenes, tetralin, styrene, methylethylbenzene, anthracene, fluoranthrene, pyrene, acenaphthylene and toluene.

Particularly suitable arylsulfonic acids generally comprise α- and β-naphthalenesulfonic acids, in a ratio of the α- to the β-isomers of from 20:1 to 1:8, in particular from 10:1 to 1:5.

Suitable aromatic carboxylic acids or derivatives thereof include for example naphthalenecarboxylic acid, naphthalic acid, terephthalic acid, isophthalic acid, benzoic acid, trimellitic acid, phenylacetic acid, phenoxyacetic acid, salicylic acid, p-hydroxybenzoic acid, diphenylacetic acid, m-hydroxybenzoic acid, benzenetetracarboxylic acid or acid anhydrides, such as phthalic anhydride, trimellitic anhydride, benzene-1,2,4,5-tetracarboxylic dianhydride or naphthalic anhydride.

Suitable long-chain aliphatic carboxylic acids are in particular saturated or olefinically unsaturated, linear or branched aliphatic monocarboxylic acids having from 8 to 22, preferably from 8 to 18, carbon atoms of natural or synthetic origin, for example higher fatty acids such as caprylic acid, capric acid, lauric acid, myristic acid, palmitic acid, stearic acid, oleic acid, linoleic acid or linolenic acid, or synthetically produced carboxylic acids such as 2-ethylhexanoic acid, isononanoic acid or isotridecanoic acid.

Also of interest are mixtures of anhydrides, mixtures of carboxylic acids, mixtures of salts of the contemplated carboxylic acids and also mixtures of carboxylic acids and anhydrides. Suitable carboxylic acid salts include the alkali metal, ammonium or alkaline earth metal salts, for example those obtainable by neutralization of these carboxylic acids with sodium hydroxide, potassium hydroxide, lithium hydroxide, sodium carbonate, magnesium carbonate, calcium oxide, calcium hydroxide, ammonia or alkanolamines, such as ethanolamine, diethanolamine or triethanolamine.

Particular preference is given to using sodium benzoate, sodium phenylacetate, sodium salicylate, sodium 4-hydroxybenzoate, sodium terephthalate, sodium 2-hydroxy-3-naphthalenecarboxylate, naphthalene-1-carboxylic acid, phthalic anhydride or benzoic acid in the dispersants.

The dye preparations of this invention preferably comprise dispersants comprising A) from 50 to 97% by weight, in particular from 70 to 95% by weight, of one or more arylsulfonic acid-formaldehyde condensates, and B) from 3 to 50% by weight, in particular from 5 to 30% by weight, of one or more aromatic or long-chain aliphatic carboxylic acids, their salts or their anhydrides or a mixture thereof.

The arylsulfonic acid-formaldehyde condensation products used according to this invention as dispersants are products known per se. They are described for example in U.S. Pat. No. 5,186,846.

The preferred water-soluble dispersants based on alkoxylated phenols are those of the formula III or IV

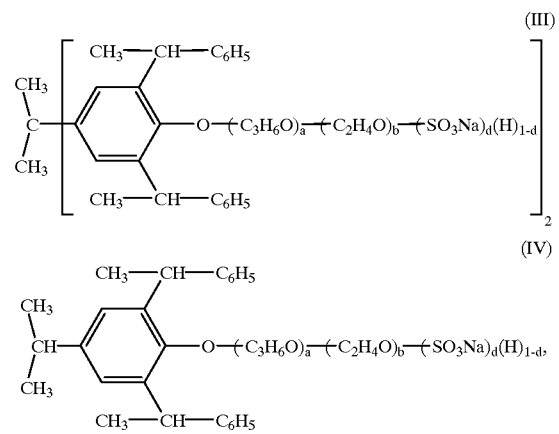

where a is from 0 to, on average, 125, b is on average from 37 to 250, the ratio of b:a being at least 1:1 in the case of b>37, and d is 0 or 1, or mixtures thereof.

The products of the formulae III and IV are obtained by reacting the phenol derivatives of the formula V or VI

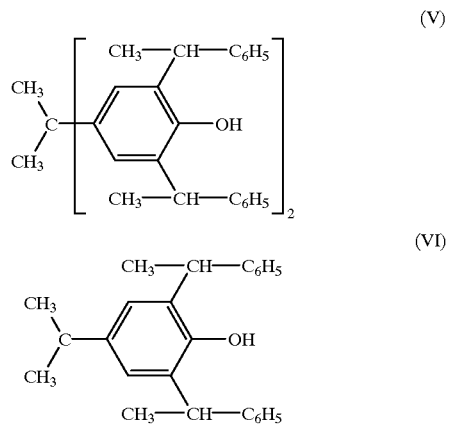

with propylene oxide and subsequent reaction of the adduct with ethylene oxide or by reacting V and/or VI with ethylene oxide. If desired, the adducts are wholly or partly converted using chlorosulfonic acid or sulfur trioxide into acid sulfuric esters and the resulting acid esters rendered neutral with alkalis.

The phenols of the formulae V and VI are obtained by reacting phenol or 2,2-(p,p'-bishydroxydiphenyl)propane with 3 or 4 mol of styrene in the presence of an acid as catalyst. The phenols V and VI are reacted according to known methods first with ethylene oxide or only with ethylene oxide in the presence of acidic or alkaline catalysts to form the corresponding alkoxylation products III and IV where d=0. The alkoxylation can be effected for example according to the process described in U.S. Pat. No. 2,979,528. In the case where b>37, the equation $$\frac{b}{a} > 1$$

has to be satisfied.

The acid sulfuric esters are prepared by reacting the alkoxylation products with chlorosulfonic acid or sulfur trioxide, the amount being chooseable to sulfate all the free hydroxyl groups or only some. The latter case gives rise to mixtures of compounds of the formulae III and IV which contain free and sulfated hydroxyl groups. For use as dispersants, the as-synthesized acid sulfuric esters are converted into water soluble salts. Advantageous water soluble salts include the alkali metal salts, for example the sodium or potassium salts. Chlorosulfonic acid requires two equivalents of alkali, sulfur trioxide one. An advantageous alkali is an aqueous alkali metal hydroxide. The temperature should not exceed 70° C. during the neutralization. The salts obtained can be used in the form of aqueous solutions or else be isolated as such and used in solid form.

Preference is given to dye preparations comprising dispersants wherein a is from 0 to, on average, 2.5, b is on average from 37 to 250 and d is from 0 to, on average, 0.5. Very particular preference is given to preparations comprising dispersants in which a is from 0 to, on average, 2.5, b is on average from 50 to 100 and d is on average 0.5.

The abovementioned dispersants are compounds known per se. They are described for example in U.S. Pat. No. 4,218,218.

Preference is given to dye preparations comprising, based on the weight of the preparation, from 1 to 15% by weight of one or more pyridine dyes, from 0.5 to 10% by weight of a dispersant and optionally water.

Preference is further given to dye preparations further comprising, based on the weight of the preparation, from 0.1 to 30% by weight, preferably from 0.1 to 25% by weight, of a carbohydrate and from 0.1 to 20% by weight, preferably from 0.1 to 15% by weight, of a polyethylene glycol.

Suitable carbohydrates for inclusion in the dye preparations of this invention are for example sorbitol and glucose.

Suitable polyalkylene glycols for inclusion in the dye preparations of this invention are in particular polyethylene or polypropylene glycols which have for example an average molecular weight of from 100 to 1000, preferably from 100 to 600 and in particular about 400. If desired, it is also possible to use ethylene oxide/propylene oxide copolymers.

Preference is further given to dye preparations further comprising, based on the weight of the preparation, from 10 to 90% by weight, preferably from 10 to 70% by weight, of a mono- or polyhydric alcohol or mixtures thereof.

Suitable mono- or polyhydric alcohols are generally alkane-monools or -polyols having from 2 to 8 carbon atoms, preferably from 2 to 6 carbon atoms, and up to 4, preferably up to 3, alcoholic hydroxyl groups. Examples are ethane-1,2-diol, propane-1,2-diol, propane-1,3-diol, glycerol, pentane-1,2,5-triol and hexane-1,2,6-triol.

Further possible constituents of the dye preparations of this invention include for example assistants, such as preservatives, antioxidants, foam inhibitors or viscosity regulators. These agents are known per se and commercially available. If these agents are present in the dye preparations of this invention, their total amount is generally 1% by weight or less, based on the weight of the preparation.

Furthermore, preferred dye preparations may also comprise surfactants to reduce the surface tension and to improve the wetting behavior in the ink head.

Preferred dye preparations comprise surfactants based on ethoxylated or propoxylated fatty or oxo alcohols, propylene oxide-ethylene oxide block copolymers, ethoxylates of oleic acid or alkylphenols, alkylphenol ether sulfates, alkylpolyglycosides, alkyl phosphonates, alkylphenyl phosphonates, alkyl phosphates, alkylphenyl phosphates or alkyndiols.

The total amount of the constituents in the dye preparations of this invention is always 100% by weight, of course. If the sum of the constituents of the dye preparations of this invention adds up to a value which is less than 100% by weight, the remainder is generally water.

The dye preparations of this invention customarily have a viscosity of from 1 to 4 mm$^2$/sec, preferably from 2 to 3.5 mm$^2$/sec.

The surface tension of the dye preparations of this invention is generally within the range from 30 to 70 Nm/m, preferably within the range from 40 to 60 Nm/m.

The pH of the dye preparations of this invention is generally within the range from 2 to 11, preferably within the range from 3 to 10.

The novel dye preparations are prepared in a conventional manner. For instance, the dye, for example in the form of a press cake, can be mixed together with the dispersant and optionally polyethylene glycol in the presence of water and predispersed in a suitable apparatus. The resulting mixture can then be treated in a mill to achieve the desired dye particle size. Finally, the final adjustment can be effected by adding appropriate amounts of water, optionally polyethylene glycol and/or carbohydrates and optionally further assistants and, after mixing, filtering by means of a sieve, preferably a sieve having a pore size of 1 μm.

The dye preparations of this invention are advantageously useful as inks in the inkjet process and also for textile sublimation transfer printing.

The inkjet printing process is usually carried out with aqueous inks, which are sprayed as small droplets directly onto the substrate. There is a continuous form of the process, in which the ink is pressed at a uniform rate through a nozzle and the jet is directed onto the substrate by an electric field depending on the pattern to be printed, and there is an interrupted inkjet or drop-on-demand process, in which the ink is expelled only where a colored dot is to appear, the latter form of the process employing either a piezoelectric crystal or a heated hollow needle (bubble or thermal jet process) to exert pressure on the ink system and so eject an ink droplet. These techniques are described in Text. Chem. Color 19 (1987), No. 8, 23–29, and 21 (1989), No. 6, 27–32.

The dye preparations of this invention are particularly useful as inks for the bubble jet process or for the process employing a piezoelectric crystal.

Suitable substrates for the inkjet process include the below-recited substrate materials as well as paper.

In textile sublimation transfer printing, a pattern is initially preformed on a transfer and then transferred by means of heat to a substrate. The dye can be fixed not only in the course of the transfer process itself but also in a subsequent fixation and aftertreatment operation. This process is common knowledge and described for example in Ullmann's Encyclopedia of Industrial Chemistry, 5th Edition, Volume A26, pages 499 to 501.

Suitable substrates include in particular textile materials, for example fibers, yarns, threads, knits, wovens or nonwovens composed of polyester, modified polyester, for example anionically modified polyester, blend fabrics of polyester with cellulose, cotton, viscose or wool, polyamide, polyacrylonitrile, triacetate, acetate, polycarbonate, polypropylene or polyvinyl chloride, polyester microfibers or else polymer-coated substrates, such as metal foils, glass or ceramic.

The novel dye preparations are notable for not causing inkjet nozzle blockages. Furthermore, their use leads to stripe-free prints.

the Examples which follow illustrate the invention.

Dyes

TABLE 1

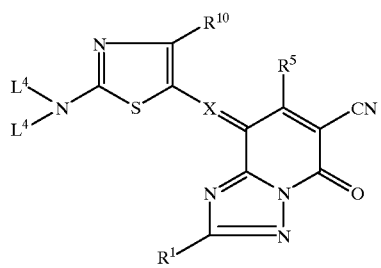

| Dye No. | $L^4L^5N$ | $R^{10}$ | X | $R^5$ | $R^1$ |
|---|---|---|---|---|---|
| 1 | $(C_4H_9)_2N$ | $C_6H_5$ | N | $CH_3$ | $CH(C_2H_5)C_4H_9$ |
| 2 | $[(CH_3)_2CH]_2N$ | $C_6H_5$ | N | $CH_3$ | $CH(C_2H_5)C_4H_9$ |
| 3 | $(C_4H_9)_2N$ | $C(CH_3)_3$ | CH | $CH_3$ | $CH(C_2H_5)C_4H_9$ |
| 4 | $(C_6H_{13})_2N$ | H | CH | $CH_3$ | $CH_3$ |

TABLE 2

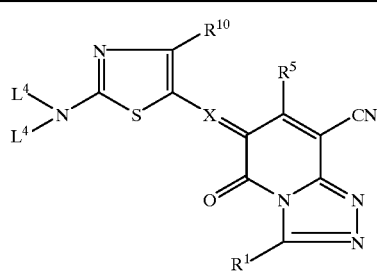

| Dye No. | $L^4L^5N$ | $R^{10}$ | X | $R^5$ | $R^1$ |
|---|---|---|---|---|---|
| 5 | $[(CH_3)_2CH]_2N$ | $CH(C_2H_5)C_4H_9$ | CH | $CF_3$ | $CH(CH_3)_2$ |
| 6 | $(C_4H_9)_2N$ | $C_6H_5$ | CH | $CF_3$ | $CH(CH_3)_2$ |
| 7 | $(C_6H_9)_2N$ | $C_6H_5$ | CH | $CH_3$ | $CH(CH_3)_2$ |

Dye No. 8

(C_4H_9)_2N — thiazole-pyridine-triazole structure with $C_6H_5$, $CH_3$, CN, $C_2H_5$ substituents

TABLE 3

Structure with $L^4$, $L^5$, $R^{10}$, $R^5$, $R^6$ substituents on thiazole–pyridinedione

| Dye No. | $L^4L^5N$ | $R^{10}$ | $R^5$ | $R^6$ |
|---|---|---|---|---|
| 9 | $(C_2H_5)_2N$ | $C(CH_3)_3$ | $CH_3$ | $C_4H_9$ |
| 10 | $(C_4H_9)_2N$ | $C_6H_5$ | $CH_3$ | $N(COC_6H_5)(COCH_3)$ |
| 11 | $(C_4H_9)_2N$ | $C(CH_3)_3$ | $CH_3$ | $C_4H_9$ |
| 12 | $(C_4H_9)_2N$ | $C_6H_5$ | $CF_3$ | $C_4H_9$ |
| 13 | $(C_2H_5)_2N$ | $C(CH_3)_3$ | $CH_3$ | $CH_3$ |
| 14 | $(C_4H_9)_2N$ | $C(CH_3)_3$ | $CH_3$ | $C_3H_6OCH_3$ |
| 15 | $(C_4H_9)_2N$ | $CH(CH_3)_3$ | $CF_3$ | $CH_3$ |
| 16 | $C_2H_5$-N-cyclohexyl(H) | $C_6H_5$ | $CH_3$ | $NHCOC_6H_5$ |
| 17 | $(C_4H_9)_2N$ | $CH_2C(CH_3)_3$ | $CF_3$ | $C_2H_5$ |
| 18 | $(C_6H_{13})_2N$ | $C_6H_5$ | $CH_3$ | $CH_3$ |
| 19 | $[C_2H_5(CH_3)CH]_2N$ | $C(CH_3)_3$ | $CH_3$ | $CH_3$ |

TABLE 4

[Structure: pyridine-2,6-dione with R⁵ and CN at 3,5-positions, Q at 4, R⁶ on N]

| Dye No. | Q | R⁵ | R⁶ |
|---|---|---|---|
| 20 | (C₄H₉)₂N–C₆H₃[(CH₃)₃CCO–NH]–N= | CH₃ | C₄H₉ |
| 21 | 2H-benz[cd]indol-2-ylidene-methyl (HN-) | CH₃ | C₆H₁₃ |
| 22 | 2H-benz[cd]indol-2-ylidene-methyl (HN-) | H | C₇H₁₅ |
| 23 | (3,3-dimethyl-1-methylindolin-2-ylidene)-CH=N= | CH₃ | C₄H₉ |
| 24 | (3,3-dimethyl-1-methylindolin-2-ylidene)-CH=CH= | CF₃ | CH₂CH(C₂H₅)C₄H₉ |

Dispersants

The arylsulfonic acid-formaldehyde condensation product dispersant used was a product which further comprises benzoic acid and is described in U.S. Pat. No. 5,186,846 as Example 3 (Dispersant 1).

Further dispersants used were water-soluble dispersants based on alkoxylated phenols, which U.S. Pat. No. 4,218,218 describes as Example 13 (Dispersant 2).

A) Textile Application

Making of Dye Preparation (Method 1)

15 g of dye, 15 g of polyethylene glycol (average molecular weight: 400), 7.5 g of a dispersant, 0.37 g of a 50% strength by weight aqueous solution of glutardialdehyde and 0.75 g of 47% strength by weight aqueous solution of tetramethylolacetylenediurea are made up with water to a total weight of 100 g and converted into a paste in a mill. Thereafter the pH is adjusted to 8.5 with 10% strength by weight sodium hydroxide solution.

The mixture is milled in a stirred ball mill so that 99% of the dye particles have a size less than 1 μm.

For final adjustment, 26.7 g of millbase are admixed with a further 4 g of polyethylene glycol (see above), 0.1 g of 50% strength by weight aqueous solution of glutardialdehyde, 0.3 g of 47% strength by weight aqueous solution of tetramethylolacetylenediurea and 20 g of 70% strength by weight aqueous sorbitol solution, made up with water to a total weight of 100 g, mixed and filtered through a sieve having a pore size of 1 μm.

The following dye preparations were obtained (the percentages are by weight in each case):

TABLE 5

| | Preparation No. | |
|---|---|---|
| | 1 | 2 |
| Dye No. 1 | 3% | 3% |
| Dispersant 1 | 1.5% | |
| Dispersant 2 | | 1.5% |
| Polyethylene glycol | 6% | 6% |
| 70% strength aqueous solution of sorbitol | 20% | 20% |
| 50% strength aqueous solution of glutardialdehyde | 0.2% | 0.2% |
| 4% strength aqueous solution of tetramethylolacetyleneurea | 0.5% | 0.5% |
| Fully demineralized water | 69.1% | 69.1% |
| Total | 100% | 100% |

The dye preparations have the following physical and printing properties

TABLE 6

| | Preparation No. | |
|---|---|---|
| | 1 | 2 |
| pH | 8.5 | 3.5 |
| Surface tension [mN/m] | 45.9 | 48.0 |
| Viscosity [mm$^2$/sec] | 2.54 | 2.4 |
| Particle size distribution [μm] × 50 | 0.51 | 0.51 |
| Particle size distribution [μm] after aging a) × 50 | 0.55 | 0.55 |
| Particle size distribution [μm] after aging b) × 50 | 0.52 | 0.52 |
| Drop weight [ng] 10 million drops minimum/maximum | 95/99 | 63/66 |
| Dispersion factor | >99% | >99% |

Test Methods and Evaluations

1) Surface Tension

The surface tension was measured with a Krüss K 10 digital tensiometer. The values reported in Table 2 are the averages of 3 measurements.

2) Viscosity

The viscosity was determined by the Ubbelohde method (DIN 51662).

3) pH

The pH was determined with a Knick 763 pH meter.

4) Particle Size Determination

The particle size distribution was measured with an Alcatel CILAS HR 850 granulometer.

5) Aging Stability

The aging stability of the preparations (inks) was investigated by two methods:

a) by a heat stress test (hot storage of the inks at 60° C. for 3 days)

b) by a freezing-heating treatment cycle (4 h freezing of the inks at −20° C. and subsequent heat treatment at 70° C. for 4 h). This temperature cycle was repeated 4 times in each case.

After the two aging tests, the particle size distribution of the aged inks was redetermined using the CILAS method.

6) Cogation Test

The behavior of the inks in the nozzles during the printing process is of particular importance. The following test examines the tendency of the inks to form deposits and blockages in the nozzles.

A modified Desk Jet Plus (bubble jet printer) from Hewlett-Packard was used as test equipment.

First, the average drop weight was determined as a function of the voltage applied to the nozzles. Then 1 million pulses were sent to each nozzle at constant voltage and thereafter the average drop weight of a defined number of drops was redetermined. This operation was repeated 10 times in total.

With an ideal ink, the average drop weight should remain constant over the test period.

The change in the drop weight of the individual inks is shown in Table 2.

7) Dispersion Factor 100 ml of each ink were stored for 7 days at room temperature in a graduated cylinder. Then 10 ml of the dispersion were removed from the base of the cylinder and 10 ml from the surface, and the color strength of each portion was determined by photometry.

The dispersion factor is calculated from the color strength of the upper dispersion/color strength of the lower dispersion×100=dispersion factor.

B) Application to Paper

Making of Dye Preparation (Method 2)

10 g of dye, 5 g of dispersant No. 1 and 135 ml of water are ground in a stirred ball mill. For final adjustment, sufficient water is added for the dye content of the aqueous preparation to be 3% by weight.

Preparation of Inkjet Prints on Paper

The prints were prepared using a commercially available inkjet printer from Hewlett-Packard (HP 500) on the following commercially available papers:

a) Intercopy paper b) Claire Fontaine paper c) Premium glossy paper from Hewlett-Packard d) Inkjet paper from Zweckform e) Specially coated paper from Epson In addition, printing trials were carried out on a paper f) coated as follows:

Intercopy paper was first coated with a 10% strength by weight solution of polyvinyl alcohol, dissolved in a mixture of 20:45:20 v/v/v toluene/methyl ethyl ketone/cyclohexanone by means of a 12 μm doctor, then with a 5% strength by weight solution of ethylhydroxyethylcellulose in 8:2 v/v toluene/ethanol, likewise by means of a 12 μm doctor, and finally with a 5% strength by weight aqueous solution of carboxymethylcellulose by means of a 24 μm doctor.

The preparations used for the printing trials were the preparations prepared from dyes No. 1 to 24 by method 2, which were each diluted to twice their volume with water before use.

After a 24 h drying time, the prints thus prepared on the abovementioned papers possessed good abrasion resistance, good water resistance and also good light fastness. An additional heat treatment of the prints (150° C. for 30 sec) is found to produce a distinct increase in the color strength and the brilliance. In addition, the abrasion resistance and the light fastness improve and a more level coloration is obtained. These observations are particularly pronounced on papers d) and e).

Dyes No. 9 and 10 on paper e) after heat treatment give the following values under illumination with standard illuminant NLD 65 (angle of incidence 10 degrees):

TABLE 7

|  | Dye No. | |
| --- | --- | --- |
|  | 9 | 10 |
| L* (with heat treatment) | 59.12 | 55.51 |
| L* (without heat treatment) | 67.71 | 62.56 |
| C* (with heat treatment) | 74.35 | 80.04 |
| C* (without heat treatment) | 68.16 | 62.67 |
| Hue angle (with heat treatment) | 5.33 | 341.79 |
| Hue angle (without heat treatment) | 357.00 | 337.35 |

Similar results are obtained with dyes 1 to 8 and 11 to 24.

We claim:

1. A process for inkjet printing comprising applying to a substrate through an inkjet a dye composition comprising, based on the weight of the composition, from 0.1 to 30% by weight of one or more methine dyes, from 0.1 to 20% by weight of a dispersant based on an arylsulfonic acid-formaldehyde condensation product comprising from 3 to 50% by weight, based on the weight of the dispersant, of one or more aromatic or long-chain aliphatic carboxylic acids, their salts, their anhydrides or a mixture thereof, or from 0.1 to 20% by weight of a water-soluble dispersant based on alkoxylated phenols of the formula III or IV

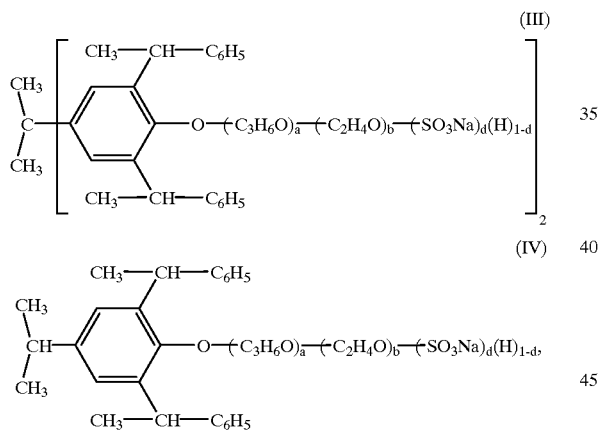

where a is from 0 to, on average, 125, b is on average from 37 to 250, the ratio of b:a being at least 1:1 in the case b>37, and d is 0 or 1, or mixtures thereof and optionally water.

2. The process as claimed in claim 1, where said composition comprises from 1 to 15% by weight of one or more methine dyes, from 0.5 to 10% by weight of a dispersant and optionally water.

3. The process as claimed in claim 1, from 0.1 to 30% by weight of a carbohydrate and from 0.1 to 20% by weight of a polyalkylene glycol.

4. The process as claimed in claim 1, wherein said composition further comprises from 10 to 90% by weight of a mono- or polyhydric alcohol or mixtures thereof.

5. The process as claimed in claim 1, wherein 99% of the dye particles are smaller than 1 μm.

6. The process as claimed in claim 1, wherein said dyes include dyes of the formula Ia, Ib or Ic

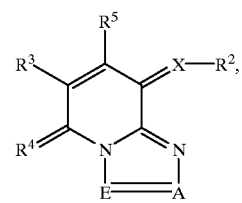

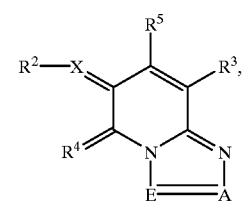

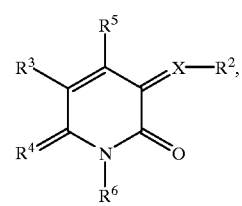

where

X is nitrogen or CH, one of the two radicals A and E is nitrogen and the other is a radical of the formula C—$R^1$, where $R^1$ is $C_1$–$C_{20}$-alkyl with or without substitution and with or without interruption by from one to four oxygen atoms in ether function, substituted or unsubstituted phenyl or hydroxyl, $R^2$ is a radical of the benzene, indole, quinoline, aminonaphthalene, pyrrole, benzimidazole, benzthiazole, aminothiophene or diaminopyridine series, $R^3$ is cyano, carbamoyl, carboxyl or $C_1$–$C_4$-alkoxycarbonyl, $R^4$ is oxygen or a radical of the formula $C(CN)_2$, $C(CN)COOL^1$ or $C(COOL^1)_2$, where $L^1$ is in each case $C_1$–$C_8$-alkyl with or without interruption by one or two oxygen atoms in ether function, or phenyl, $R^5$ is hydrogen, $C_1$–$C_8$-alkyl with or without substitution and with or without interruption by one or two oxygen atoms in ether function, or substituted or unsubstituted phenyl, and $R^6$ is $C_1$–$C_{20}$-alkyl with or without substitution and with or without interruption by one to four oxygen atoms in ether function, substituted or unsubstituted phenyl, hydroxyl or a radical of the formula $NL^2L^3$, where $L^2$ and $L^3$ are independently of each other hydrogen, substituted or unsubstituted $C_1$–$C_{12}$-alkyl, $C_5$–$C_7$-cycloalkyl, substituted or unsubstituted phenyl, substituted or unsubstituted pyridyl, substituted or unsubstituted $C_1$–$C_{12}$-alkanoyl, $C_1$–$C_{12}$-alkoxycarbonyl, substituted or unsubstituted $C_1$–$C_{12}$-alkylsulfonyl, $C_5$–$C_7$-cycloalkylsulfonyl, substituted or unsubstituted phenylsulfonyl, substituted or unsubstituted pyridylsulfonyl, substituted or unsubstituted benzoyl, pyridylcarbonyl or thienylcarbonyl, or $L^2$ and $L^3$ are together with the linking nitrogen atom unsubstituted or $C_1$–$C_4$-alkyl-substituted succinimido, unsubstituted or $C_1$–$C_4$-alkyl-substituted phthalimido or a five- or six-membered saturated heterocyclic radical which optionally contains further hetero atoms.

* * * * *